July 23, 1963 E. J. DOMBROWSKI 3,098,608
RESTORING MECHANISM FOR PIN CARRIAGES
Filed Feb. 26, 1962 2 Sheets-Sheet 1
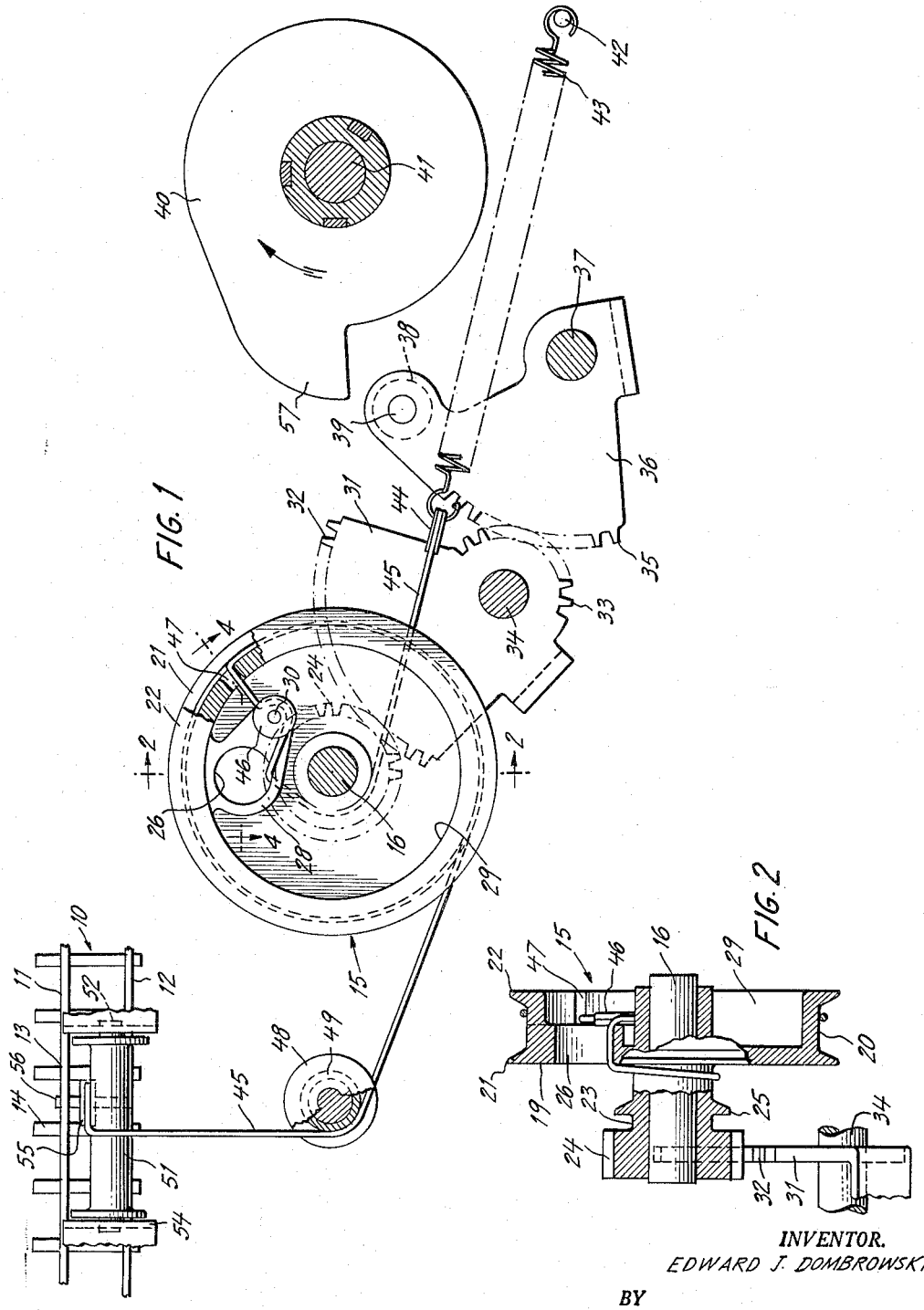
INVENTOR.
EDWARD J. DOMBROWSKI
BY
C. R. Miranda
ATTORNEY

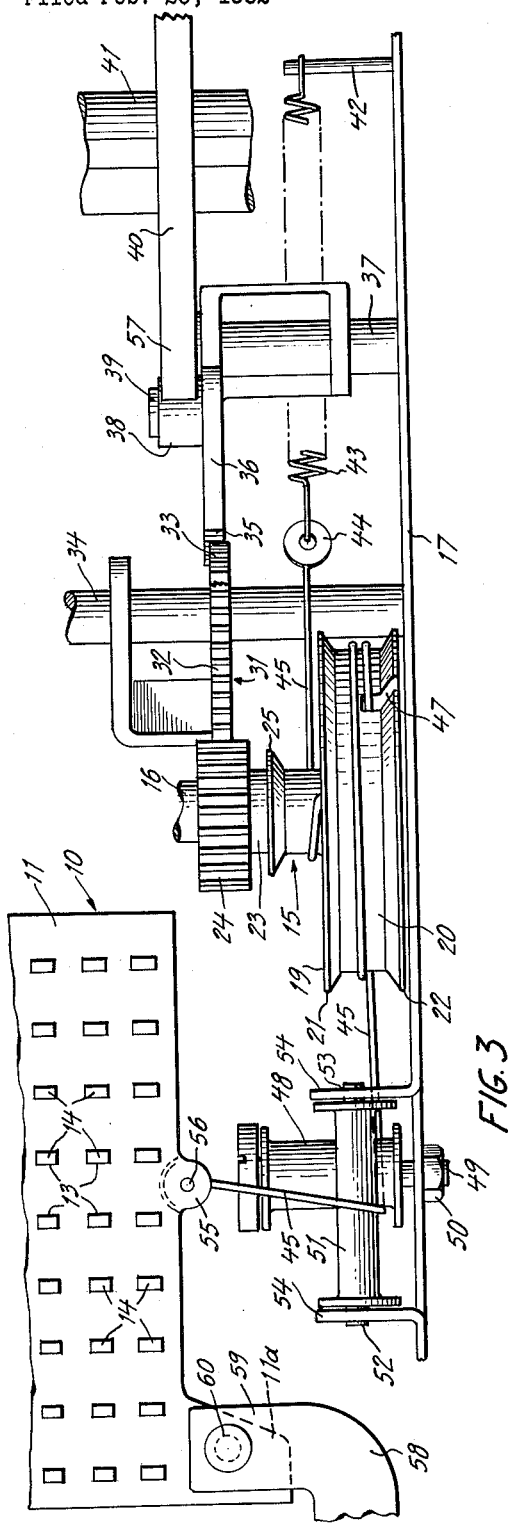
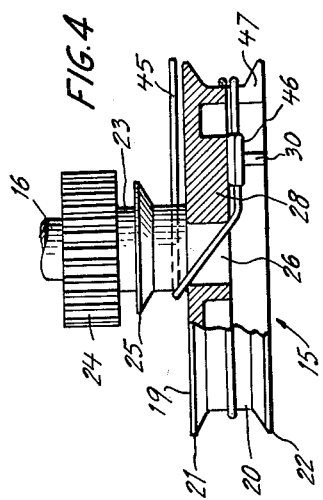

United States Patent Office 3,098,608
Patented July 23, 1963

3,098,608
RESTORING MECHANISM FOR PIN CARRIAGES
Edward J. Dombrowski, Derby, Conn., assignor to Sperry Rand Corporation, New York, N.Y., a corporation of Delaware
Filed Feb. 26, 1962, Ser. No. 175,734
7 Claims. (Cl. 235—60)

This invention relates to improvements in restoring mechanism for pin carriages employing settable pins.

Pin carriages which utilize settable pins are used in various equipment such as key-set calculators, card sensing devices and card punching devices. In some key-set calculators for example, a pin box containing a row of settable pins for each digital order of the machine is mounted in a carriage which is moved laterally one digital order with each depression of a key member on the keyboard. As the key members are operated successively, a corresponding pin in each order is depressed and set. When the desired number of orders are set, a motor bar key is depressed to cycle the machine and racks move to engage the set pins. In the movement of the racks into engagement with the set pins, the desired numerical amounts are entered into accumulators in a manner well known to those skilled in the art. After such entry, the racks return to their original positions and the pin carriage is returned to its start position preparatory to another cycling of the calculator. In addition, the pins that were set are returned to their original positions. In repeated high speed cycling of the machine it is necessary that the pin carriage be returned rapidly and effectively to its start position.

It is an object of the present invention to provide a novel restoring mechanism for a pin carriage and which restoring mechanism includes a compact assembly of parts mounted on a common supporting plate and requiring only a relatively small operating area in a machine employing an escapable pin carriage.

Another object of the present invention is to provide a novel compact pin carriage restoring mechanism including a minimum amount of parts and which is rapid and effective in operation.

Another object is to provide a novel pin carriage restoring mechanism which is economical to manufacture and assemble and which requires a minimum amount of adjustment.

A further object is to provide a novel flexible drive means and driven spool arrangement that effectively and rapidly restores a pin carriage to its start position.

The present invention contemplates a flexible drive member attached to the pin carriage and which is partially wrapped on a novel spool device. The spool device is rotated in one direction by the flexible drive member with the escapement of the pin carriage. There is also provided novel means on the spool which cooperate with a cam mechanism mounted on the same support plate as the spool device to rotate the spool device in the opposite direction to rewrap the flexible drive member on the spool device upon a cycling of the machine to return the pin carriage to start position. The cooperation of elements effectively and rapidly restores the pin carriage to its start position in the machine.

The above and other objects and advantages of the present invention will appear more fully hereinafter from a consideration of the detailed description which follows taken together with the accompanying drawings wherein one embodiment of the invention is illustrated.

In the drawings:

FIGURE 1 is an elevational view of the principal parts of the pin carriage restoring mechanism and such parts are shown in relation to parts of a calculator;

FIGURE 2 is a sectional view of the spool member taken on the line 2—2 of FIGURE 1;

FIGURE 3 is a plan view of the principal parts of the pin carriage restoring mechanism as shown in FIGURE 1; and FIGURE 4 is a partial sectional plan view of the spool member of FIGURE 1.

Referring now to the drawings for a more detailed description of the present invention and more particularly to FIGURE 1, wherein one preferred embodiment is clearly illustrated, a pin carriage is generally indicated by the numeral 10. Pin carriage 10 includes spaced parallel top and bottom plates 11 and 12, respectively, joined together by any suitable fastening means. Top plate 11 is provided with slots 13 (FIGURE 3) and a corresponding equal number of slots (not shown) are provided in bottom plate 11. Slots 13 are aligned with the slots in the bottom plate and a settable pin 14 is slidably disposed in each pair of aligned slots. Pin carriage 10 is mounted for lateral movement, that is, in directions into and out of the plane of the drawing as seen in FIGURE 1, in any well known manner such as on parallel guide rails which are not shown.

A spool 15, shown in FIGURE 3, is rotatably mounted on a shaft 16 affixed to a supporting frame plate 17. Spool 15 is preferably formed of a suitable lightweight material as for example, molded plastic and includes a side wall 19 and a rim 20. Rim 20 is provided at its edges with opposed flanges 21 and 22. A hollow shaft 23 is formed integral with wall 19 and extends normal (FIGURE 3) thereto. A pinion 24 is formed on one end of shaft 23 and the latter is provided with guide flange 25 intermediate the pinion 24 and wall 19. A cord receiving aperture 26 is provided in wall 19, adjacent shaft 23, and extends through an L-shaped guide projection 28. Projection 28 depends from the inner surface of rim 20 in the interior or recessed portion 29 of spool 15 as clearly seen in FIGURE 1. The leg of projection 28 is provided with a pin 30 at one end thereof for purposes to be hereinafter explained.

Disposed adjacent pinion 24 is an intermediate idler gear sector 31 having oppositely disposed toothed portions 32 and 33, respectively. Sector 31 is rotatably mounted on a shaft 34 which is secured to the frame plate 17. Portion 32 of gear sector 31 meshes with the teeth of pinion 24 whereas portion 33 of sector 31 meshes with a toothed portion 35 of a gear sector 36 which is rotatably mounted on a shaft 37 affixed to the support plate 17. A cam follower roller 38 is rotatably mounted on a stub shaft 39 secured to sector 36 and lying in the plane of rotation of a restoring cam 40. Restoring cam 40 is mounted for rotation with a main cam shaft 41.

An inturned flange portion or bracket 42 of support plate 17 (to the right of FIGURE 3) has attached thereto one end of a coil spring 43. The opposite end of coil spring 43 has secured thereto a metal eyelet 44 to which is pressed one end of a draw cord or flexible drive member 45. The flexible drive member is preferably a cord of nylon material but is not limited thereto, since other means such as wire may be used. Draw cord 45 extends from the spring 43 and is led under and halfway around the spool shaft 23 (FIGURE 1) between the intermediate flange 25 and wall 19 of the spool 15. The cord is then passed through cord receiving aperture 26 (FIGURE 2) and led partially around the pin 30 (FIGURE 4) of the L-shaped projection 28 in the recessed interior 29 of the spool. A metal washer 46 is affixed to pin 30 to prevent the cord disengaging from the pin. The draw cord is threaded from pin 30 through a notch 47 in rim 20 to the surface of the rim 20 between flanges 21 and 22. The cord bears against the edge surface of notch 47 and is wrapped one and a half turns around the surface of rim 20, in order to securely grip the rim for reasons to be hereinafter explained and extends tangentially therefrom to the surface of a guide roller 48. Guide roller 48 is rotatably mounted on a stub shaft 49 which has a reduced diameter portion extending through support plate 17 and is affixed thereto by a nut 50, as shown in FIGURE 3. The draw cord is guided along part of the surface of guide roller 48 and extends transversely of the longitudinal axis thereof to a second guide roller 51. Guide roller 51 has pintles 52 formed integrally thereon which rotatably mount the guide roller 51 in apertures 53 of inturned flanges 54 of the support plate 17. The draw cord 45 is then led transversely of the longitudinal axis of guide roller 51 to the pin carriage 10. The end of the cord 45 as seen in FIGURE 1 is attached to a metal eyelet 55 which is secured to a mounting pin 56 which is securely positioned between the top and bottom plate 11 and 12 of the pin carriage to attach the draw cord 45 to the pin carriage.

As previously indicated, the present invention is applicable to equipment such as key-set calculators, card sensing devices, card punching devices and the like. For purposes of explanation, here the subject pin box restoring mechanism is assumed as embodied in a key-set calculator wherein the pin carriage escapes rather than being stationary. In operation of a key-set calculator, the pin carriage will escape one position or order along its guide rails (not shown) with each depression of a key member (not shown) in a manner well known to one skilled in the art. When the pin carriage moves into the plane of the drawing as seen in FIGURE 1 from the start position, the position shown in FIGURES 1 and 3, it carries the draw cord 45, the draw cord unwinding from spool 15 and moving the latter clockwise (FIGURE 1). The clockwise movement of spool 15 is effected by the unwinding of draw cord 45 from its relatively tight grip on rim 20. This driving action is assisted by the portion of the draw cord bearing against the edge surface of notch 47 in rim 20, as clearly seen in FIGURE 1, which prevents slippage of the draw cord during the escapement of the pin carriage 10. Pinion 24 meshed with toothed portion 32 of the intermediate idler gear sector 31 causes toothed portion 33 meshed with the toothed portion 35 of gear sector 36 to move the gear sector 36 clockwise on shaft 37 moving the cam follower roller 38 toward and under the lobe 57 of the restoring cam 40 (FIGURE 1). The restoring cam 40 remains in the position shown in FIGURE 1 during the escapement of the pin carriage 10. During the course of the pin carriages' escapement, coil spring 43 is in tension whereby draw cord 45 is maintained taut and tight on spool 15 to cause the draw cord to drive the spool positively in a clockwise direction (FIGURE 1) as explained above. At the extreme limit of the pin carriage escapement, approximately a one half turn of the draw cord is unwound from the rim 20. Pin carriage 10 escaping a desired number of positions, according to the number of orders that have been selected by the operator of the calculator, stops and a motor bar key (not shown) is operated to cycle the machine in a well known manner. In operation of a calculator, the setting of pins 14 and their function is well known, in that the pins 14 that have been set regulate the movement of racks (not shown). The racks are released to engage the set pins during the cycling of the calculator and enter selected amounts into accumulators (not shown). The main cam shaft 41 rotates one complete clockwise revolution (FIGURE 1) during the cycling period. In the last half of the main cam shaft cycle, the lobe 57 of restoring cam 40 engages the cam follower roller 38 on gear sector 36. Roller 38 is rocked by the lobe 57 of restoring cam 40 in a counter-clockwise direction (FIGURE 1) and toothed portion 35 of sector 36 rocks the toothed portion 33 of intermediate idler sector 31 in a clockwise direction. Pinion 24 is thereby caused to move in a counter-clockwise direction to rotate the spool member 15 in the same direction. The counter-clockwise movement of the spool member wraps the draw cord 45 onto the rim 20 returning the pin carriage 10 in a reverse direction to restore the pin carriage to start position in the calculator. As the pin carriage returns to the start position the pins 14 that were set contact a bevelled plate (not shown) or other similar means to restore the pins to their upper position in the pin carriage. After the last pin 14 has been restored, the restoring cam 40 disengages from the cam follower roller 38 on the gear sector 36 allowing the pin carriage 10 to return to start position. Coil spring 43, during the return movement of the pin carriage 10, relaxes gradually and keeps the draw cord 45 taut so that the draw cord, rapidly and effectively, brings the pin carriage to start position.

If the operator due to an error in his entry of a number into the pin carriage, desires to return the pin carriage to start position without cycling the machine as above described, he may return the pin carriage through manual operation of correction lever 58 which operates in a well known manner. Correction lever 58 is only partially shown in FIGURE 3 and one end 59 thereof is shown therein rigidly secured to a corner portion 11a of top plate 11 of the pin carriage 10 by a rivet 60. The opposite end of lever 58 extends through an opening in the machine casing (not shown). In order to manually return the pin carriage to start position, the operator pulls the lever 58 in a direction toward support plate 17 as seen in FIGURE 3. Correction lever 58 carries with it the pin carriage 10 along the guide rails (not shown) and tension on coil spring 43 is relaxed causing draw cord 45 to rotate the spool 15 counter-clockwise (FIGURE 1). The counter-clockwise movement of pinion 24 thereby returns the gear sector 36 to start position through intermediate sector 31 and without interference with restoring cam 40.

It is apparent from the foregoing description that the novel spool and flexible drive arrangement described has many advantages in operation. The spool provides novel structure cooperating with the flexible drive member and with the described cam mechanism to rapidly and effectively restore a pin carriage to a start position after a cycling of the machine. Due to the simplicity of construction and minimum amount of parts, the cost of manufacture is reduced and repair and maintenance of the pin box restoring mechanism is kept at a minimum. The fact that the main parts of the restoring mechanism, as described, are mounted on a common supporting plate at one side of the machine provide for a compact pin carriage restoring device that requires a relatively small operating area. This is of importance in calculators, for example, wherein the space beneath and above the pin carriage (FIGURE 1) is to be made available for other mechanisms of the machine.

Although one embodiment of the present invention has been illustrated and described in detail, it is to be expressly understood that the invention is not limited thereto. Various changes can be made to the design and the arrangement of parts without departing from the spirit and scope of the invention as the same will now be understood by those skilled in the art.

What is claimed is:
1. In a restoring mechanism for an escapable pin carriage for returning the latter from an escaped position to a start position,
(a) a support member disposed in a plane extending normal to the plane in which the pin carriage travels,
(b) a spool mounted for rotation on said support for rotation about an axis arranged normal to the first mentioned plane,
(c) a spring having a fixed end,
(d) a flexible drive member having one end connected to the pin carriage and the other end connected to the other end of said spring,
(e) said flexible drive member having a portion intermediate the ends thereof wrapped on said spool and said portion maintained taut thereon by said spring, (f) said flexible drive member moving the pin carriage from an escaped position to a start position upon rotation of the spool in one direction, (g) a guide roller mounted on said support member between the spool and pin carriage and disposed in the plane of travel of said pin carriage, (h) said flexible drive member guided from said spool and partially around said guide roller and extending transversely of the longitudinal axis thereof to said pin carriage to effect straight line movement of said flexible drive member upon rotation of said spool in said one direction, (i) and means coacting with the spool and effective for rotating said spool in said one direction.

2. The restoring mechanism of claim 1 wherein said flexible drive member is a draw cord.

3. A restoring mechanism for escapable pin carriage, comprising,
   (a) a support member,
   (b) a spool rotatably mounted on said support member,
   (c) a pinion carried by said spool,
   (d) a gear sector mounted on said support member for pivotal movement,
   (e) a cam follower mounted on said gear sector,
   (f) gear means connecting said gear sector to said pinion,
   (g) a flexible drive member connected to the pin carriage and partially wrapped on said spool,
   (h) said flexible drive member unwrapping from said spool and rotating said spool and pinion in one direction upon escapement of said pin carriage from a start position,
   (i) said gear means effecting rotation of said gear sector and said cam follower in the said one direction through said pinion during escapement of said pin carriage,
   (j) and cam means to provide for movement of said cam follower and gear sector in a reverse direction upon movement of said cam means into engagement with said cam follower after completion of pin carriage escapment,
   (k) said gear means rotating said pinion in the said reverse direction through said gear sector to rewrap said flexible drive member on said spool thereby returning the pin carriage to start position.

4. A restoring mechanism for an escapable pin carriage, comprising,
   (a) a support member disposed in a plane extending normal to the plane in which the pin carriage travels,
   (b) a spool rotatably mounted on said support member,
   (c) a pinion carried by said spool,
   (d) a gear sector mounted on said support member for pivotal movement,
   (e) a cam follower mounted on said gear sector,
   (f) gear means connecting said gear sector to said pinion,
   (g) a spring having a fixed end,
   (h) a draw cord having one end connected to the other end of said spring and the opposite end of the draw cord connected to the escapable pin carriage,
   (i) said draw cord having a portion intermediate the ends thereof wrapped on said spool,
   (j) said spring maintaining the draw cord taut on said spool,
   (k) said draw cord unwrapping from said spool and rotating said spool and pinion in one direction upon escapment of said pin carriage from a start position,
   (l) said gear means effecting rotation of said gear sector and said cam follower in the said one direction through said pinion during escapment of said pin carriage,
   (m) and cam means to provide for movement of said cam follower and gear sector in a reverse direction upon movement of said cam means into engagement with said cam follower after completion of pin carriage escapment,
   (n) said gear means rotating said pinion in the said reverse direction through said gear sector to rewrap said draw cord on said spool thereby returning the pin carriage to start position.

5. The pin carriage restoring mechanism of claim 4 wherein said spool has,
   (a) a shaft having one end affixed to said spool,
   (b) said pinion affixed to the opposite end of said shaft,
   (c) a cord receiving aperture in said spool adjacent said shaft,
   (d) said draw cord extending from said spring means and wrapped partially around said shaft between said spool and pinion and threaded through said cord receiving aperture to the interior of said spool,
   (e) a rim on said spool,
   (f) and a notch opening in said rim,
   (g) said draw cord threaded from said cord receiving aperture and through said notch opening and bearing against an edge surface of said rim at said notch opening and then wrapped around said rim.

6. The pin carriage restoring mechanism of claim 5 wherein means are formed on the inner surface of said rim to guide said draw cord from said cord receiving aperture to said notch opening.

7. The pin carriage restoring mechanism of claim 6 wherein said means for guiding said draw cord comprises,
   (a) a projection depending from the inner surface of said rim,
   (b) and a pin on the end of said projection having the draw cord partially wrapped thereon.

References Cited in the file of this patent

UNITED STATES PATENTS

| | | |
|---|---|---|
| 2,816,641 | Beach | Dec. 17, 1957 |
| 2,872,013 | Wittwer | Feb. 3, 1959 |
| 3,001,702 | Dustin | Sept. 26, 1961 |